(12) United States Patent  
Bouffier

(10) Patent No.: US 7,844,025 B2  
(45) Date of Patent: Nov. 30, 2010

(54) FUEL ASSEMBLY FOR A PRESSURIZED WATER NUCLEAR REACTOR CONTAINING PLUTONIUM-FREE ENRICHED URANIUM

(75) Inventor: Marcel Bouffier, Chaponnay (FR)

(73) Assignee: Areva NP, Courbevoie (FR)

( * ) Notice: Subject to any disclaimer, the term of this patent is extended or adjusted under 35 U.S.C. 154(b) by 276 days.

(21) Appl. No.: 10/580,678

(22) PCT Filed: Nov. 25, 2004

(86) PCT No.: PCT/FR2004/003025

§ 371 (c)(1),  
(2), (4) Date: Jan. 25, 2007

(87) PCT Pub. No.: WO2005/055246

PCT Pub. Date: Jun. 16, 2005

(65) Prior Publication Data

US 2007/0195919 A1 Aug. 23, 2007

(30) Foreign Application Priority Data

Nov. 27, 2003 (FR) ................................. 03 13950

(51) Int. Cl.  
*G21C 3/32* (2006.01)

(52) U.S. Cl. .................. 376/435; 376/434; 376/428

(58) Field of Classification Search .................. 376/435, 376/434, 428  
See application file for complete search history.

(56) References Cited

U.S. PATENT DOCUMENTS

| | | | | |
|---|---|---|---|---|
| 3,048,532 A | * | 8/1962 | Thorp, II | 403/319 |
| 3,366,546 A | * | 1/1968 | Anthony et al. | 376/353 |
| 3,576,717 A | * | 4/1971 | Thorp | 376/224 |
| 3,930,938 A | * | 1/1976 | Berglund et al. | 376/224 |
| 4,224,106 A | * | 9/1980 | Delafosse | 376/416 |
| 4,326,922 A | * | 4/1982 | Ferrari et al. | 376/435 |
| 4,652,416 A | * | 3/1987 | Millot | 376/209 |
| 4,689,195 A | * | 8/1987 | Aoyama et al. | 376/435 |
| H722 H | * | 1/1990 | Sofer et al. | 376/428 |

(Continued)

FOREIGN PATENT DOCUMENTS

EP 0 196 655 10/1986

(Continued)

OTHER PUBLICATIONS

Patent Abstracts of Japan, vol. 1996, No. 08 (Aug. 30, 1996), & JP 08 086894 (Apr. 2, 1996).

(Continued)

*Primary Examiner*—Rick Palabrica  
(74) *Attorney, Agent, or Firm*—Davidson, Davidson & Kappel, LLC

(57) ABSTRACT

This fuel assembly for a pressurized water nuclear reactor comprises fuel rods which are arranged at the nodes of a substantially regular network which has a polygonal outer contour, the fuel rods containing uranium which is enriched in isotope 235 and not containing any plutonium before the assembly is used in a reactor. The rods are distributed in at least a first central group which is constituted by fuel rods which have a first level of nuclear reactivity, and an outer peripheral layer of fuel rods which have a level/levels of nuclear reactivity which is/are strictly less than the first level of reactivity.

22 Claims, 8 Drawing Sheets

U.S. PATENT DOCUMENTS

| | | | | |
|---|---|---|---|---|
| 5,094,805 A | * | 3/1992 | Suchy et al. | 376/438 |
| 5,207,979 A | * | 5/1993 | Koyama et al. | 376/419 |
| 5,249,211 A | * | 9/1993 | Nagano et al. | 376/435 |
| 5,359,634 A | * | 10/1994 | Johannesson | 376/428 |
| 5,388,132 A | * | 2/1995 | Aoyama et al. | 376/435 |
| 5,416,813 A | * | 5/1995 | Hiraiwa et al. | 376/419 |

FOREIGN PATENT DOCUMENTS

| | | |
|---|---|---|
| EP | 0094255 | 11/1993 |
| FR | 2693023 | 12/1993 |
| WO | WO 96/20484 | 7/1996 |
| WO | WO 98/14957 | 4/1998 |
| WO | WO 01/50477 A1 * | 7/2001 |

OTHER PUBLICATIONS

Patent Abstracts of Japan, vol. 1998, No. 05 (Apr. 30, 1998), & JP 10 002980 (Jan. 6, 1998).

* cited by examiner

FIG.5B

FUEL ASSEMBLY FOR A PRESSURIZED WATER NUCLEAR REACTOR CONTAINING PLUTONIUM-FREE ENRICHED URANIUM

FIELD OF THE INVENTION

The present invention relates to a fuel assembly for a pressurized water nuclear reactor, of the type comprising fuel rods which are arranged at the nodes of a substantially regular network having a polygonal outer contour, the fuel rods containing uranium which is enriched in isotope 235 and not containing any plutonium before the assembly is used in a reactor.

BACKGROUND INFORMATION

The invention is used for assemblies which are intended for pressurized water reactors (PWR), in contrast to boiling water reactors (BWR), and whose nuclear fuel is uranium which is enriched in isotope 235.

These assemblies are generally designated $UO_2$ assemblies, with reference to the nature of their fuel.

This term $UO_2$ is used in contrast to assemblies having fuel with mixed uranium and plutonium oxide which are generally designated MOx assemblies.

MOx assemblies of this type allow the plutonium which originates from the reprocessing of $UO_2$ assemblies to be reused. Document FR-2 693 023 describes a MOx assembly of this type. $UO_2$ assemblies and MOx assemblies have different neutron behaviour. In order to nonetheless allow MOx and $UO_2$ assemblies to be simultaneously loaded in the same reactor, this document has proposed that rods with different plutonium contents be used in the MOx assemblies. "Zoned" MOx assemblies are therefore referred to since these assemblies comprise zones in which the rods have different plutonium contents.

As has already been indicated above, the present invention does not relate to MOx assemblies but instead applies to $UO_2$ assemblies which do not have zone arrangements of this type, the enrichment in isotope 235 being uniform in this case. It is true that EP-799 484, for example, discloses $UO_2$ assemblies of which a few isolated rods are contaminated with gadolinium and have an enrichment in uranium 235 which is less than that of the adjacent rods. However, these are not zoned assemblies in the strict sense.

A $UO_2$ assembly comprises a skeleton for retaining the fuel rods in the nodes of a regular network which generally has a square base. The skeleton comprises a lower end, an upper end, guiding tubes which connect the two ends and grids for retaining the fuel rods.

Within the core of a pressurized water nuclear reactor, the $UO_2$ assemblies are arranged beside each other with a slight lateral spacing in the order of 2 mm. This spacing in particular allows the assemblies to be raised and lowered during operations for loading and unloading the core.

The cooling and moderation water flows in the gaps which result from this spacing and forms layers of water at that location.

The height of assemblies of this type is great and can be up to three or four metres. Owing to production tolerances, the actual thickness of the layers of water could, at least locally, be different from the nominal thickness of 2 mm.

Furthermore, assemblies which are placed in a reactor could theoretically become deformed owing to irradiation resulting in, for example, C, S or W-like shapes.

Deformations of this type would present a number of problems. During operation, they would make it more difficult to insert the control and stop rod clusters of the nuclear reactor in the guiding tubes.

During handling, these deformations would increase the risks of the assemblies becoming hooked together, for example, during operations for loading the core of the reactor.

The actual behaviour of the $UO_2$ assemblies could thus be different from that which is desired, at least in mechanical terms.

SUMMARY

An objective of the present invention is to overcome this problem by providing an assembly of the above-mentioned type which allows a reduction in the risks, in mechanical terms, of the behaviour of the assembly being different from the desired behaviour thereof.

To this end, the invention relates to an assembly of the above-mentioned type, characterised in that the rods are distributed in at least:

a first central group which is constituted by fuel rods which have a first level of nuclear reactivity, and an outer peripheral layer of fuel rods having a level/levels of nuclear reactivity which is/are strictly less than the first level of nuclear reactivity.

According to specific embodiments, the assembly may comprise one or more of the following features, taken in isolation or according to all technically possible combinations:

the rods of the peripheral layer are distributed in:

a second group of fuel rods which extend along the faces of the outer contour of the network and which have a second level of nuclear reactivity which is strictly less than the first level of nuclear reactivity; and a third group of fuel rods which are arranged at the corners of the outer contour of the network and which have a third level of nuclear reactivity which is strictly less than the second level of nuclear reactivity;

the second group extends, for each face of the outer contour of the network of fuel rods, from one corner to the other of the face in question, and the third group comprises only the fuel rods which are arranged in the corners of the outer contour of the network of fuel rods;

the different levels of nuclear reactivity of the fuel rods of the various groups are obtained by different masses of uranium 235 in the fuel rods;

the different levels of nuclear reactivity of the fuel rods of the various groups are obtained by the fuel rods having different levels of enrichment in uranium 235;

the rods of the first group have a first level of enrichment e1 in uranium 235, the rods of the second group have a second level of enrichment e2 in uranium 235 which is strictly less than the first level of enrichment e1, and the rods of the third group have a third level of enrichment in uranium 235 which is strictly less than the second level of enrichment e3;

the second level of enrichment e2 is between e1—0.8% and e1—0.2%;

the third level of enrichment e3 is between e1—1.8% and e1—0.6%; and the first level of enrichment e1 is between 3% and 6%.

The invention also relates to a nuclear reactor core, characterised in that it comprises fuel assemblies as defined above.

BRIEF DESCRIPTION OF THE DRAWINGS

The invention will be better understood from a reading of the following description, given purely by way of example, with reference to the appended drawings, in which:

FIGS. 5A and 5B are views similar to FIGS. 3A and 3B for water layer thicknesses of 12 mm.

DETAILED DESCRIPTION

Figure 1:
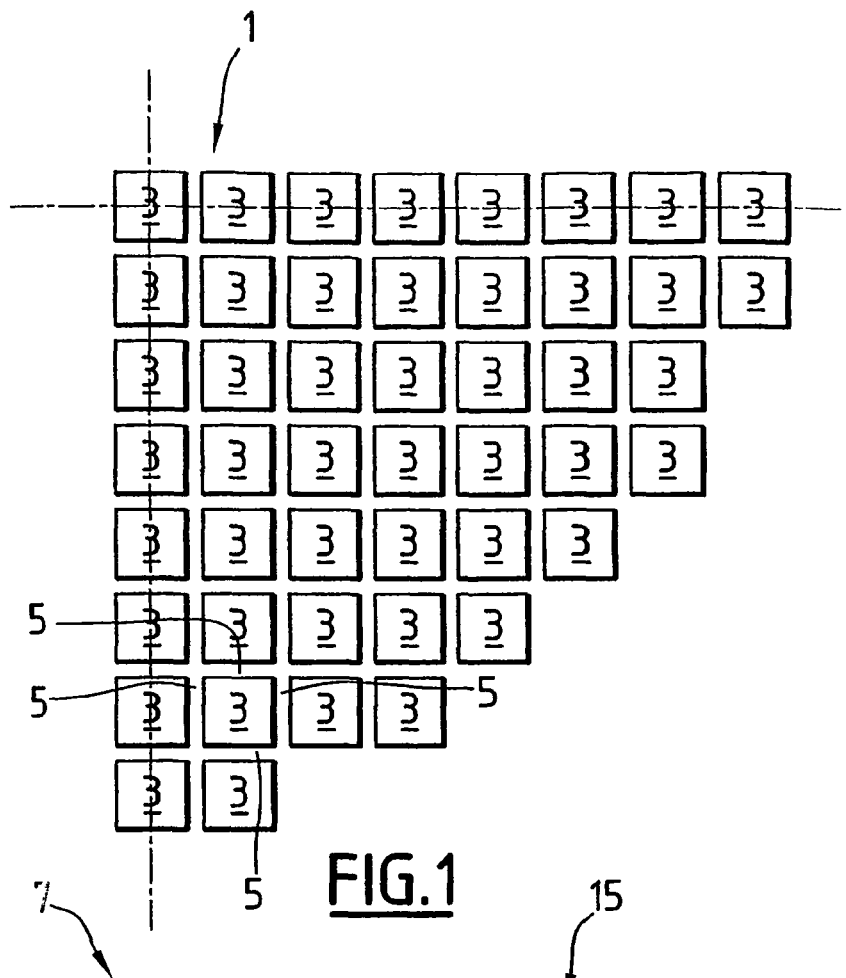
FIG. 1 is a schematic plan view illustrating a quarter of the core of a nuclear reactor according to the invention.

FIG. 1 illustrates a quarter of the core 1 of a pressurized water nuclear reactor (PWR). This reactor is therefore cooled and moderated by pressurized water. Conventionally, the core 1 has quad symmetry, the axes of symmetry being illustrated with dot-dash lines.

The core 1 comprises fuel assemblies 3 which are arranged beside each other with a mutual lateral spacing. Between the assemblies 3, gaps are consequently produced which are filled by the cooling and moderation water. The assemblies 3 are thus delimited laterally by layers 5 of water which extend over the entire height of the assemblies 3.

Typically, the nominal thickness of those water layers 5 is 2 mm.

The assemblies 3 are $UO_2$ assemblies which have uranium enriched in isotope 235 as nuclear fuel. The fuel of the assemblies 3 does not therefore contain any plutonium before they are used in the core 1.

The general structure of the assemblies 3 is conventional and will not therefore be described in detail. It should be noted simply that each assembly 3 comprises fuel rods and a skeleton for supporting and retaining these rods at the nodes of a substantially regular network.

Figure 2:
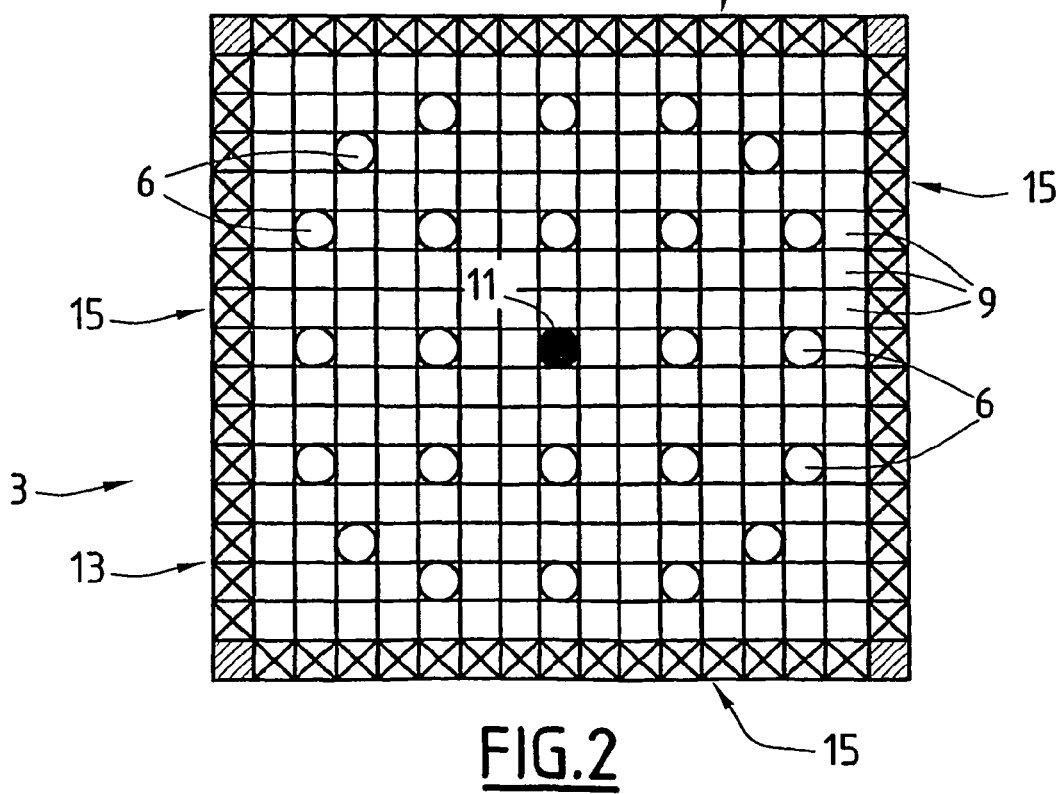
FIG. 2 is a schematic plan view illustrating the distribution of the fuel rods in one of the fuel assemblies of the core of FIG. 1, FIGS. 3A and 3B are charts illustrating the power distribution in an assembly according to the prior art and in the assembly of FIG. 2, respectively, for a water layer thickness of 2 mm.

In the example of FIG. 2, the regular network has a square base and a square outer contour.

The skeleton comprises a lower end, an upper end and guiding tubes 6 which connect these two ends and which are intended to receive the rods of a control rod cluster for controlling the operation of the core 1.

The skeleton further comprises grids 7 for retaining the fuel rods at the nodes of the regular network. These grids 7 comprise sets of interlinked plates which together delimit cells 9 which are centred on the nodes of the regular network. Each cell 9 is intended to receive a fuel rod or a guiding tube 6, the central cell 9 itself receiving an instrumentation tube 11.

In the example of FIG. 2, the retaining grids 7 comprise 17 cells 9 per side. The outer contour of the network is therefore a square comprising 17 side cells. In other variants, the number of cells 9 may be different, for example, 14×14 or 15×15.

The fuel rods are distributed in three groups, that is to say:
- a first central group whose rods occupy the cells 9 which are shown empty in FIG. 2,
- a second group of side rods which occupy the cells 9 which are marked with a cross in FIG. 2, and
- a third group of corner rods which occupy the cells 9 which are illustrated with cross-hatching in FIG. 2.

In the example illustrated, the first group comprises 200 fuel rods. This first group occupies the entire rod network, apart from the peripheral layer 13 of rods.

This first group therefore corresponds to a square having 15 side cells, including 25 cells 9 which are occupied by the guiding tubes 6 and the instrumentation tube 11.

The rods of this first group contain, as nuclear fuel, uranium which is enriched in isotope 235 with a first level of enrichment e1. This first level of enrichment e1 is approximately 4.11%. This enrichment is defined as being the mass ratio of the isotope U235 and the total amount of uranium present in the nuclear fuel of these rods.

The second group of rods comprises 60 rods which are distributed over the four faces 15 of the peripheral layer 13.

More precisely, for each outer face 15 of the fuel rod network, the 15 rods which are located between the two corner rods of the face 15 in question belong to the second group.

The fuel rods of the second group contain as nuclear fuel uranium which is enriched in isotope 235 with a second level of enrichment e2. This second level of enrichment e2 in uranium 235 is approximately 3.7%.

The third group comprises 4 rods which occupy the outer corners of the fuel rod network, that is to say, the corners of the peripheral layer 13. The nuclear fuel of the rods of the third group has a third level of enrichment e3 in uranium 235 of approximately 2.8%.

Each face 15 of the peripheral layer 13 thus comprises, at the two ends thereof, two rods of the third group and, as for the remainder, comprises rods of the second group. The remainder of the network is occupied by rods of the first group. The rods of the peripheral layer 13 which extends continuously over the periphery of the assembly 3, therefore have lower levels of enrichment than the rods at the center of the assembly.

The fuel rods of the first, second and third groups which have similar shapes but different levels of enrichment in isotope 235 therefore contain different masses of isotope 235.

The assembly 3 thus has, before use, a "zoned" configuration with corner rods which have a low level of nuclear reactivity, rods which are located along the outer faces 15 between the corners having an intermediate level of nuclear reactivity, and the other rods, which are arranged at the center of the network, which have a high level of nuclear reactivity.

As will now be set out, a zoned arrangement of this type allows satisfactory individual neutron behaviour of the assembly 3 to be ensured, even when the actual geometry of the assembly 3 differs relative to the nominal geometry thereof.

Figure 3A:
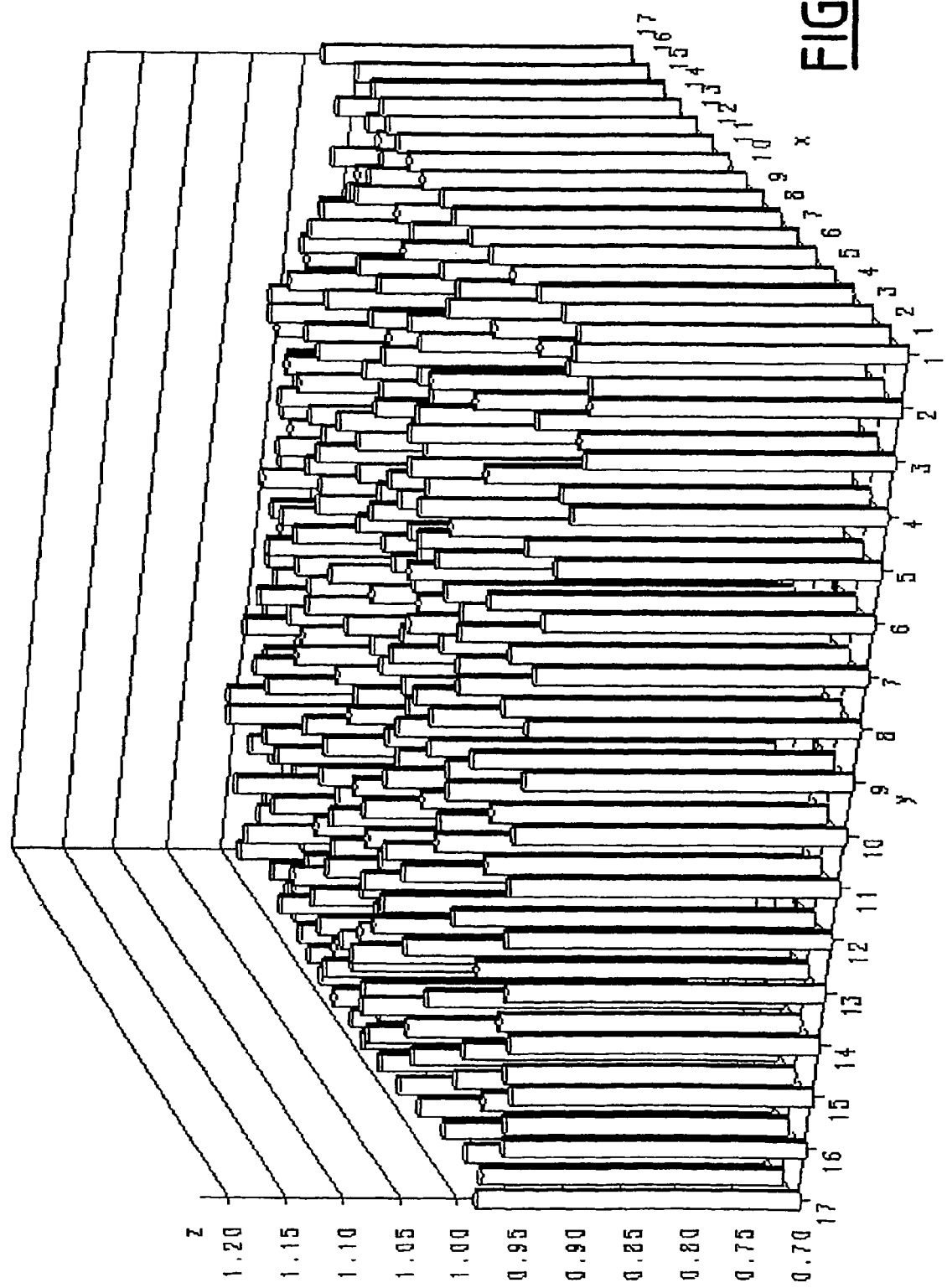

FIG. 3A thus illustrates the distribution of linear power in a fuel assembly with uranium which is enriched in isotope 235 in accordance with the prior art, that is to say, with a uniform enrichment in all the rods thereof. The thickness of the layers 5 of water which surround the assembly in question is assumed to be homogeneous and equal to 2 mm, that is to say, the nominal value. It should be noted that power values on the Y axis have been standardised relative to the mean linear power in the assembly. This power distribution has been calculated for a depletion of 150 MWj/t which corresponds to the period in the operational cycles of the assembly referred to as the "beginning of the xenon equilibrium period". This is the time at which the power distribution is supposed to be the most heterogeneous.

In the case of FIG. 3A, the power distribution is homogeneous and the form factor which corresponds to the ratio of the maximum linear power in the assembly to the mean linear power within the assembly is approximately 1.053. The form factor value which is approximately 1 confirms that the power distribution is homogeneous and satisfactory.

Figure 3B:
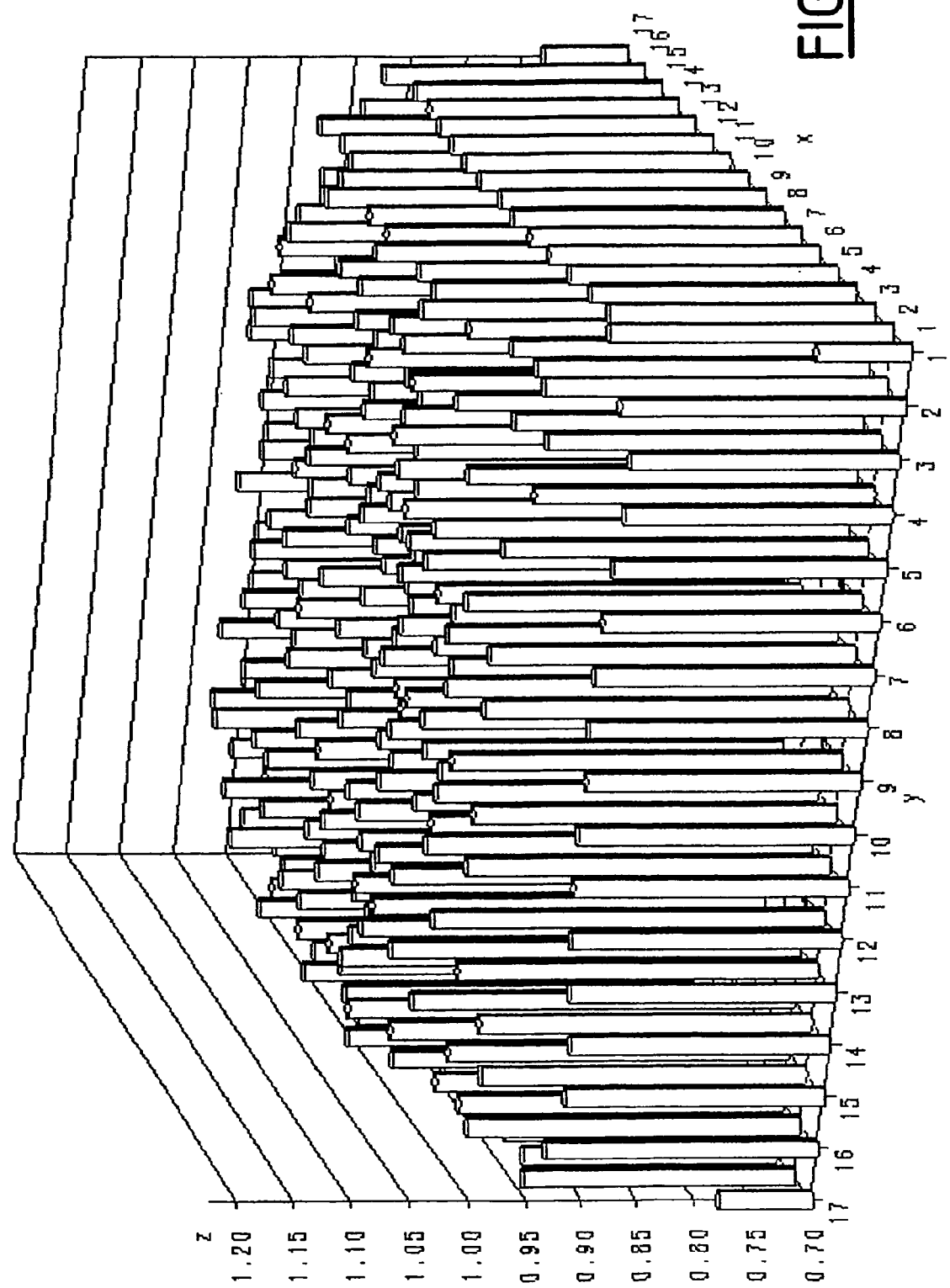

FIG. 3B is a similar chart for the assembly 3 of FIG. 2. As provided in this Figure, the linear power of the rods of the third group, that is to say, at the corners of the assembly, is much lower than that of the central rods of the first group, owing to the low nuclear reactivity level of the rods of the third group. In the same manner, the linear power provided by the rods of the second group located along the outer faces 15 of the assembly 3 is between that provided by the rods of the first group, that is to say, at the center of the assembly 3, and that provided by the rods of the third group of corner rods.

The form factor is therefore approximately 1.068. It is therefore slightly higher than in the prior art. However, the value of the power factor remains acceptable and the assembly 3 of FIG. 2 is completely suitable for use in a reactor.

Figure 4A:
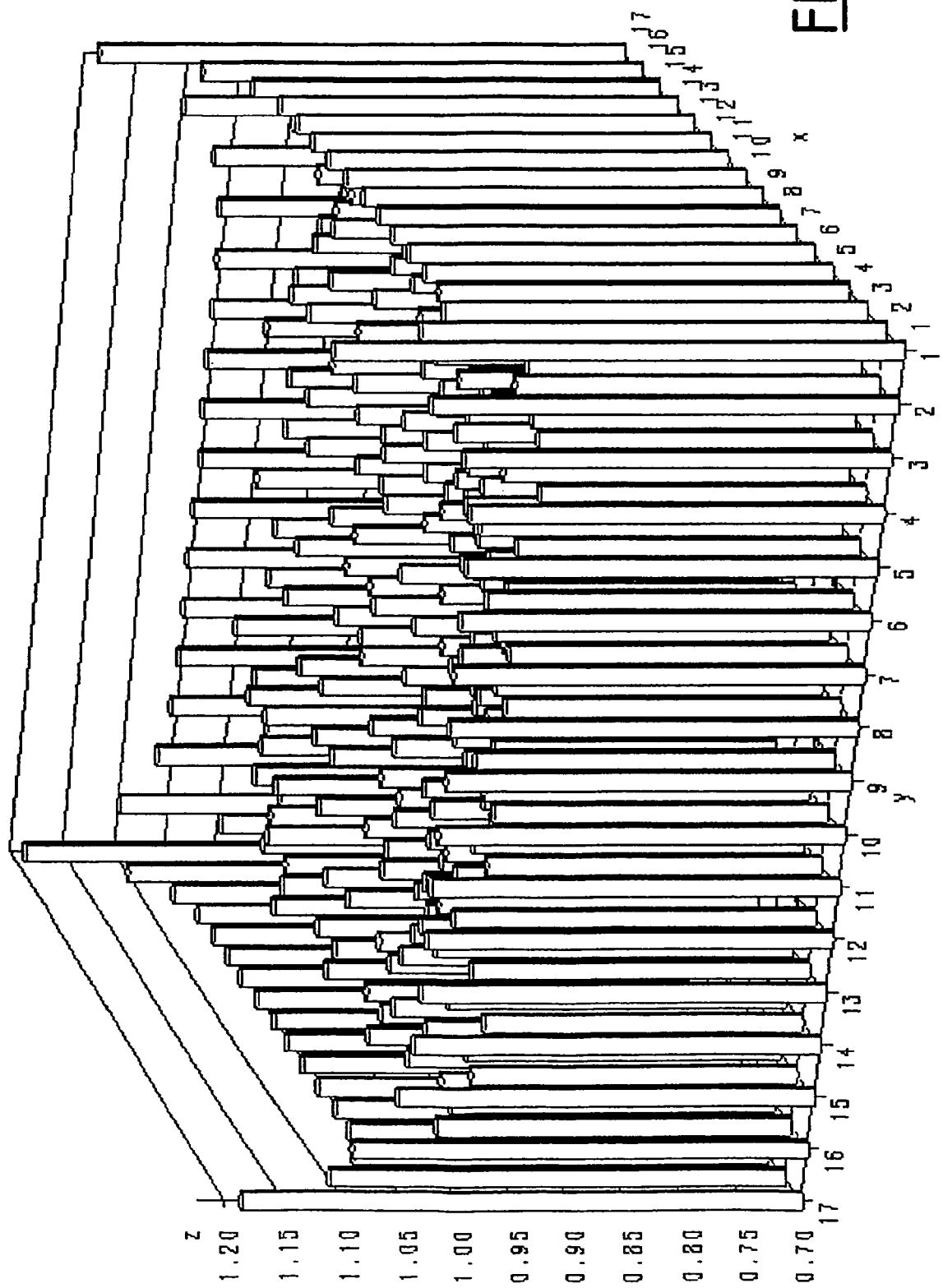
FIGS. 4A and 4B are views similar to FIGS. 3A and 3B for a water layer thickness of 7 mm.
Figure 4B:
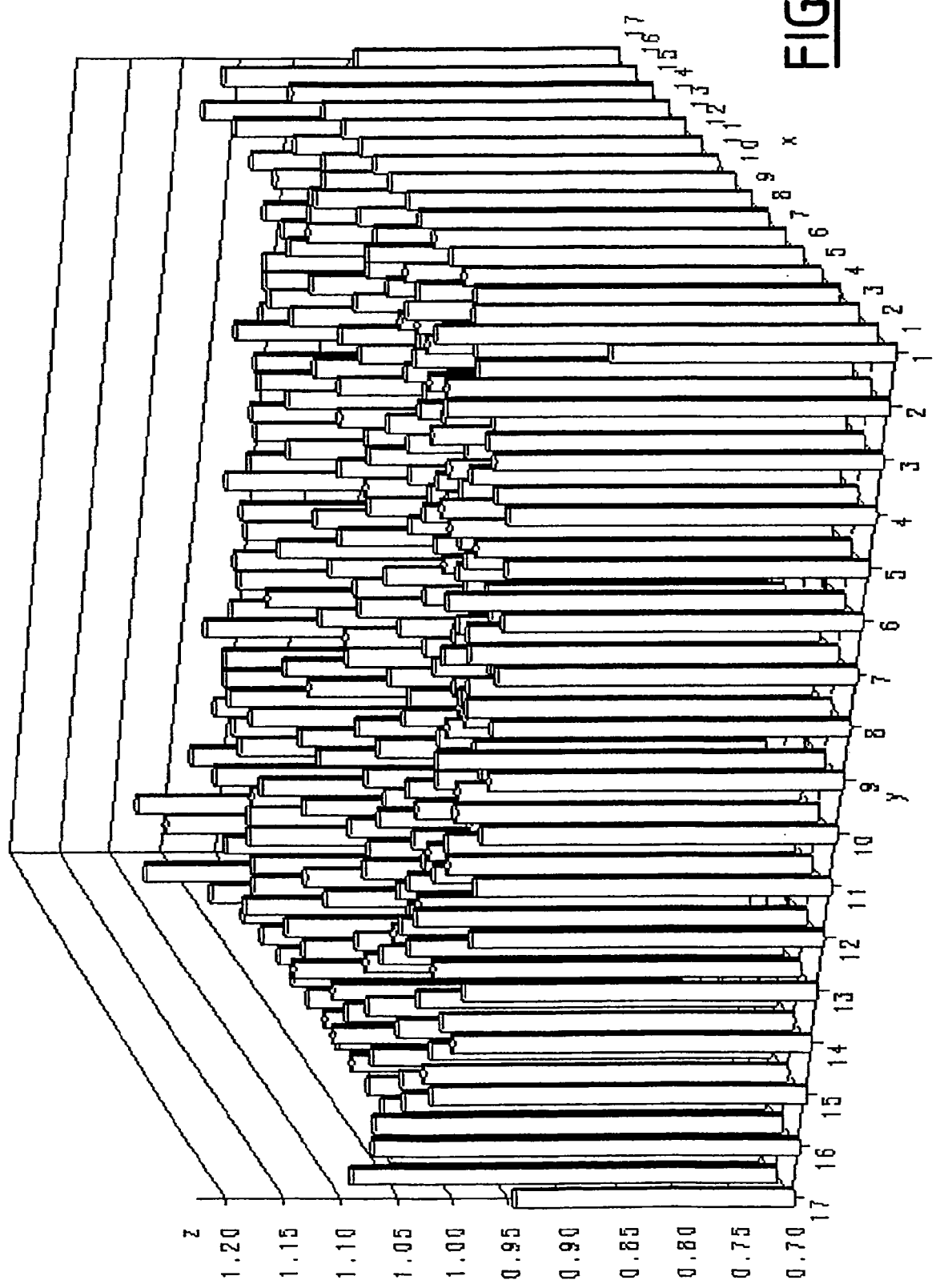

FIGS. 4A and 4B correspond to FIGS. 3A and 3B, but with water layers 5 having a homogeneous thickness of 7 mm.

As provided, the form factor increases significantly in the case of the assembly according to the prior art (FIG. 4A) to reach a value of 1.186. The power distribution is therefore highly heterogeneous, which must be prevented in a nuclear reactor core.

This fact may be explained a posteriori by the fact that the greater thickness of water in the region of the layers 5 retards the neutrons to a greater extent so that the rods which are located at the sides, and even more so those located in the corners, are more exposed to thermal neutrons which are capable of bringing about fissions and therefore generating power.

As provided in FIG. 4B, the zone arrangement of the assembly 3 of FIG. 2 allows the linear power to be reduced at the corners of the assembly 3 and along the outer faces 15 thereof in order to achieve a much more homogeneous distribution. The form factor is thus brought to a value of 1.078 which is completely satisfactory.

Figure 5A:
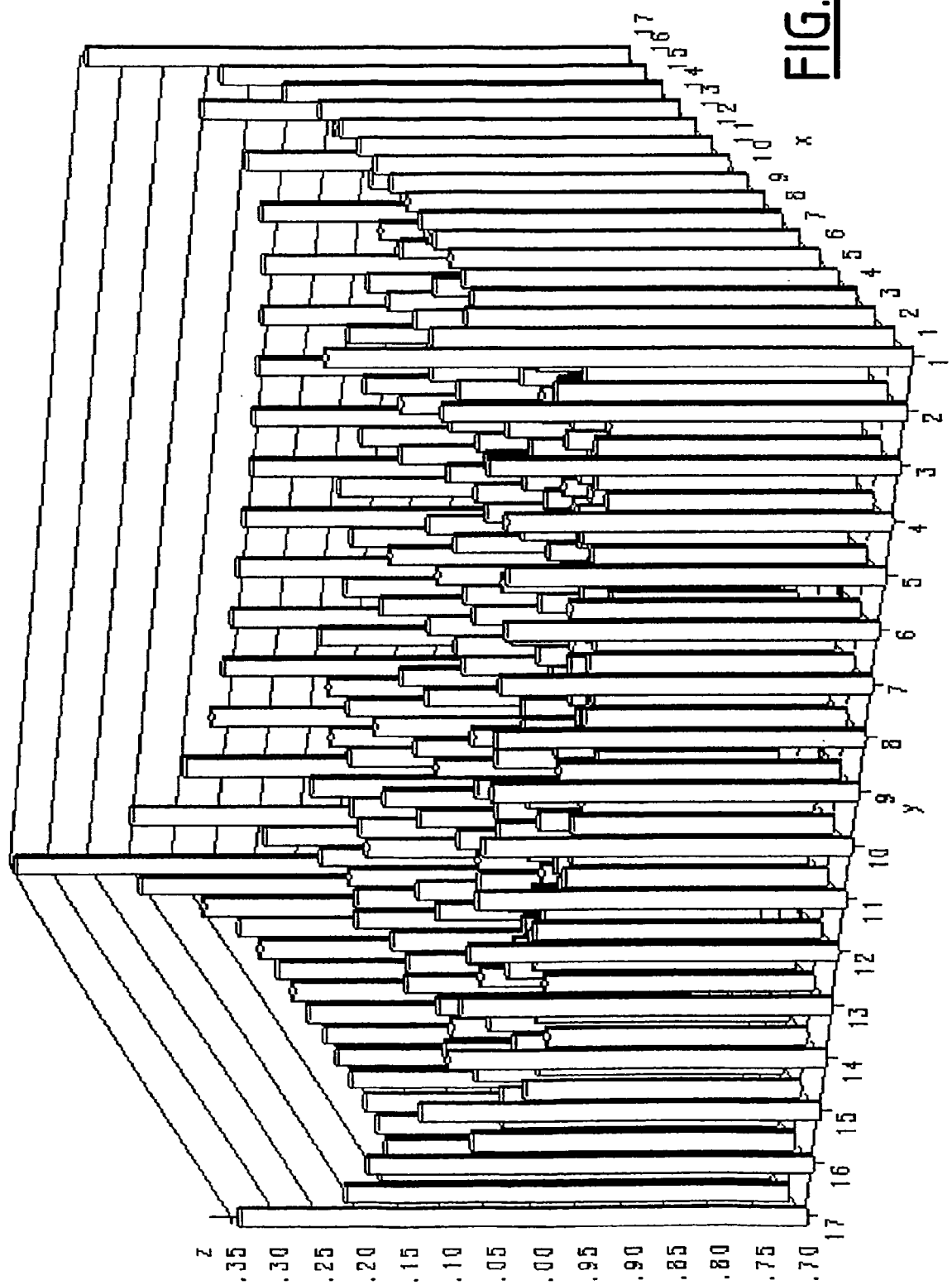
Figure 5B:
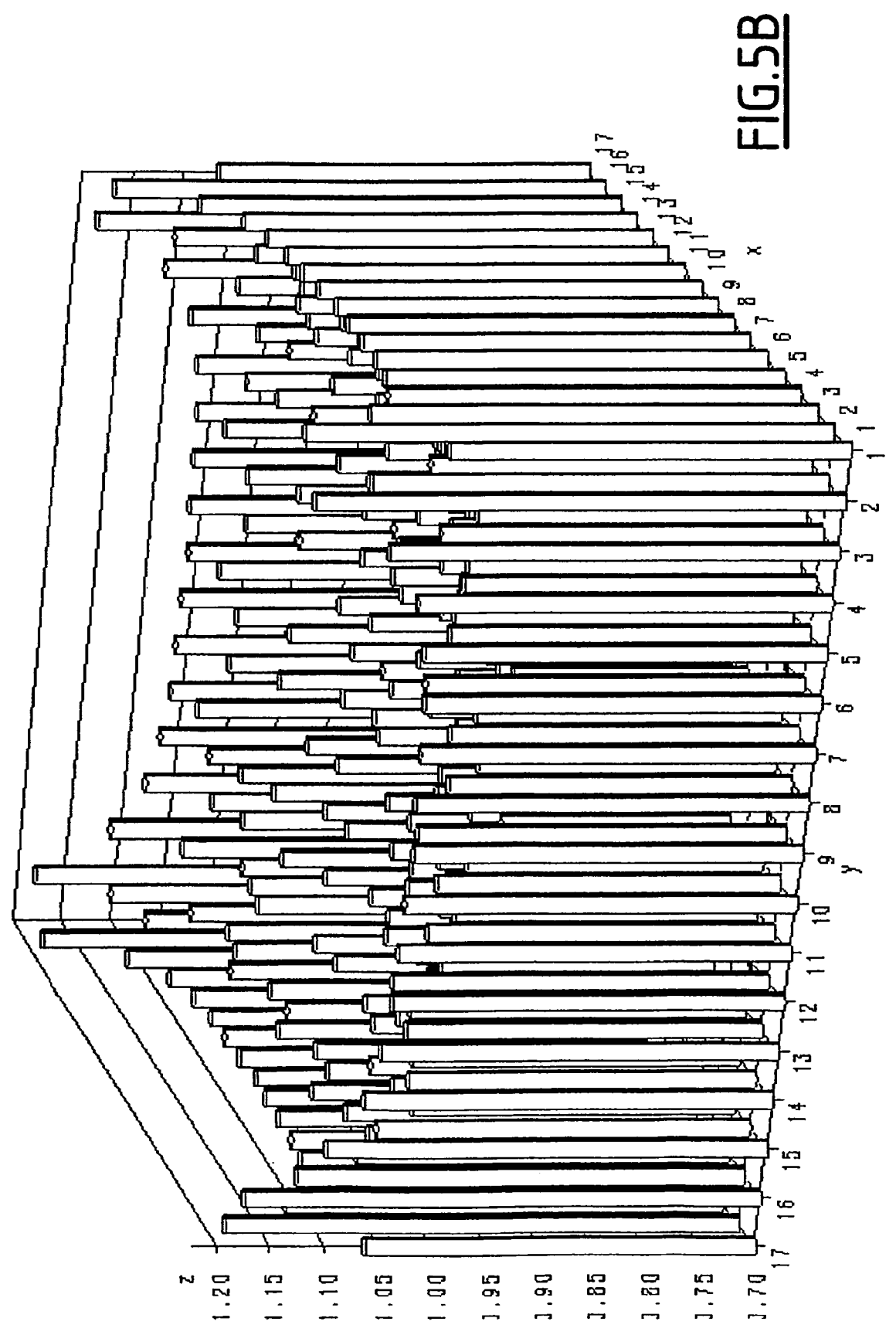

The same phenomenon can be seen for an even greater homogeneous thickness of the water layer 5, for example, 12 mm, as illustrated in FIGS. 5A and 5B. In the case of an assembly according to the prior art, the form factor is thus approximately 1.342, whilst it is approximately 1.181 in the assembly 3 of FIG. 2.

Adopting the structure of the assembly 3 of FIG. 2 therefore allows it to be ensured that the power distribution would be more homogeneous if the layers 5 of water were to have a thickness which deviated from the nominal value thereof, albeit only locally, without for all that significantly impairing this distribution if the thickness of the water layers 5 were to correspond to the nominal value.

The assembly 3 of FIG. 2 therefore allows the consequences in terms of neutrons to be reduced which the mechanical deformations of the assemblies or their production tolerances could have.

In some cases, the assembly 3 may also comprise, in particular in the first group thereof, fuel rods which contain a neutron contaminant such as gadolinium. The rods concerned may then have an enrichment in isotope 235 less than or equal to that of the group to which they belong.

Figure 6:
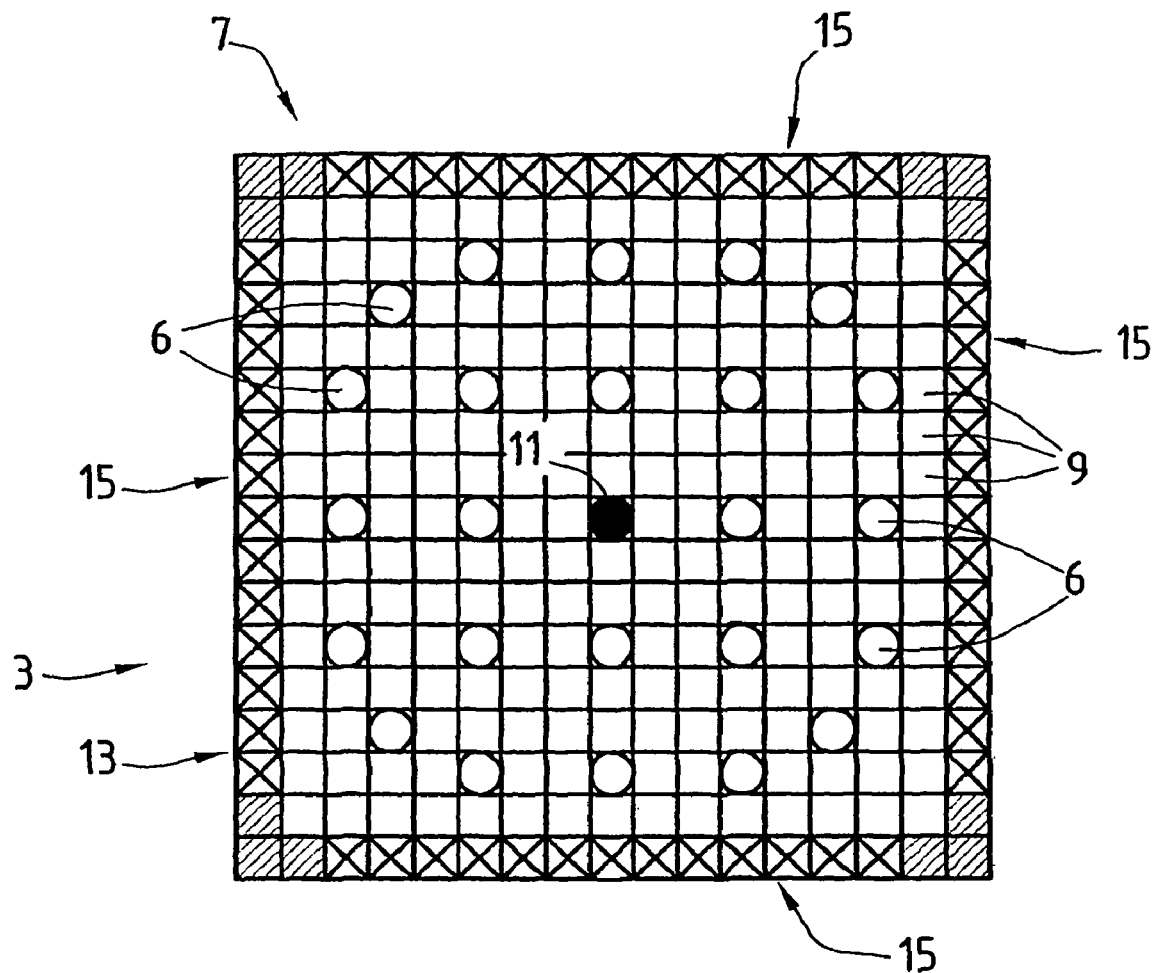
FIG. 6 is a view similar to FIG. 2 illustrating a variant of the invention.

In a variant which is illustrated in FIG. 6, the third group comprises, in addition to the four corner rods, the eight rods which are directly adjacent to the peripheral layer 13. The third group of rods thus comprises 12 rods.

However, this variant is found to be less advantageous since it more significantly impairs the power distribution if the thickness of the layers of water is equal to the nominal thickness.

In specific exemplary variants, the second level of enrichment e2 may be between e1—0.8% and e1—0.2% and the third level of enrichment e3 between e1—1.8% and e1—0.6%.

The first level of enrichment e1 is between 3% and 6%, for example.

It is also possible in one variant for the second and third group to be constituted by rods which have the same level of enrichment in isotope 235. That is to say, e2 and e3 are equal. The rods having a low level of reactivity then occupy all the peripheral layer 13 and form a group which extends continuously at the periphery of the assembly 3.

In yet another variant, the various levels of nuclear reactivity within the various groups of fuel rods may be achieved, not with different levels of enrichment in isotope 235, but instead with different diameters for the fuel rods, which also allows different masses of isotope 235 to be achieved in the rods of the different groups.

The rods of the first group thus have a first diameter, the fuel rods of the second group have a second diameter which is strictly less than the first diameter, and the fuel rods of the third group have a third diameter which is less than or equal to the second diameter. The masses of isotope 235 contained in the rods of the first, second and third groups are therefore less, as are their levels of nuclear reactivity.

More generally, the fuel rods may be arranged within the assembly in order to form a network having a polygonal outer contour other than a square.

The invention claimed is:

1. A fuel assembly for a pressurized water nuclear reactor, comprising:
   fuel rods which are arranged at nodes of a substantially regular network having a polygonal outer contour, the fuel rods containing uranium which is enriched in isotope 235 and not containing any plutonium before the assembly is used in a reactor, wherein the rods are distributed in at least:
   a first central group which is constituted by fuel rods which have a first level of enrichment e1 in uranium 235; and
   an outer peripheral layer of fuel rods distributed in:
      a second group of fuel rods that extend along faces of the outer contour of the network and that have a second level of enrichment e2 in uranium 235 strictly less than the first level of enrichment e1; and
      a third group of fuel rods that are arranged at corners of the outer contour of the network and that have a third level of enrichment e3 in uranium 235 that is strictly less than the second level of enrichment e2
      wherein the outer peripheral layer of fuel rods defines an outer periphery of the fuel assembly.

2. The fuel assembly according to claim 1, wherein first central group has rods which contain a neutron contaminant.

3. The fuel assembly according to claim 1, wherein the second group extends, for each of the faces of the outer contour of the network of fuel rods, from one corner to the other of the face in question, and the third group comprises only the fuel rods that are arranged in the corners of the outer contour of the network of fuel rods.

4. The fuel assembly according to claim 1, wherein the second level of enrichment e2 is between e1—0.8% and e1—0.2%.

5. The fuel assembly according to claim 1, wherein the third level of enrichment e3 is between e1—1.8% and e1—0.6%.

6. The fuel assembly according to claim 1, wherein the first level of enrichment e1 is between 3% and 6%.

7. The fuel assembly according to claim 1, wherein the fuel rod network has a square outer contour.

8. A nuclear reactor core, comprising:
at least two fuel assemblies, wherein each of the at least two fuel assemblies comprises fuel rods which are arranged at nodes of a substantially regular network having a polygonal outer contour, the fuel rods containing uranium which is enriched in isotope 235 and not containing any plutonium before the assembly is used in a reactor, wherein the rods are distributed in only:
a first central group which is constituted by fuel rods which have a first level of enrichment e1 in uranium 235; and
an outer peripheral layer of fuel rods distributed in:
a second group of fuel rods that extend along faces of the outer contour of the network and that have a second level of enrichment e2 in uranium 235 strictly less than the first level of enrichment e1; and
a third group of fuel rods that are arranged at corners of the outer contour of the network and that have a third level of enrichment e3 in uranium 235 that is strictly less than the second level of enrichment e2
wherein the outer peripheral layer of fuel rods defines an outer periphery of the fuel assembly.

9. The nuclear reactor core according to claim 8, wherein the first central group has rods which contain a neutron contaminant.

10. The fuel assembly according to claim 1, further comprising a skeleton, the skeleton having a lower tie plate, an upper tie plate and guide tubes for receiving rods of a control rod cluster, the guide tubes connecting the lower tie plate and the upper tie plate.

11. The nuclear reactor core according to claim 8, wherein each of the at least two fuel assemblies further comprises a skeleton, the skeleton having a lower plate, upper plate and guide tubes, the guide tubes connecting the lower plate and the upper plate.

12. The fuel assembly as recited in claim 1 wherein the fuel assemblies are in a 17 by 17 configuration.

13. The fuel assembly as recited in claim 1 wherein the fuel assemblies are at least in a 14 by 14 configuration.

14. The fuel assembly as recited in claim 1 wherein the fuel assemblies are in a 14 by 14 configuration.

15. The fuel assembly as recited in claim 1 wherein the fuel assemblies are in a 15 by 15 configuration.

16. A fuel assembly for a pressurized water nuclear reactor, comprising:
fuel rods which are arranged at nodes of a substantially regular network having a polygonal outer contour, the fuel rods containing uranium which is enriched in isotope 235 and not containing any plutonium before the assembly is used in a reactor, wherein the rods are distributed in only:
a first central group which is constituted by fuel rods which have a first level of enrichment e1 in uranium 235; and
an outer peripheral layer of fuel rods distributed in:
a second group of fuel rods that extend along faces of the outer contour of the network and that have a second level of enrichment e2 in uranium 235 strictly less than the first level of enrichment e1; and
a third group of fuel rods that are arranged at corners of the outer contour of the network and that have a third level of enrichment e3 in uranium 235 that is strictly less than the second level of enrichment e2
wherein the outer peripheral layer of fuel rods defines an outer periphery of the fuel assembly.

17. The fuel assembly according to claim 16, wherein first central group has rods which contain a neutron contaminant.

18. The fuel assembly according to claim 16, wherein the second group extends, for each of the faces of the outer contour of the network of fuel rods, from one corner to the other of the face in question, and the third group comprises only the fuel rods that are arranged in the corners of the outer contour of the network of fuel rods.

19. The fuel assembly according to claim 16, wherein the second level of enrichment e2 is between e1—0.8% and e1—0.2%.

20. The fuel assembly according to claim 16, wherein the third level of enrichment e3 is between e1—1.8% and e1—0.6%.

21. The fuel assembly according to claim 16, wherein the first level of enrichment e1 is between 3% and 6%.

22. The fuel assembly according to claim 16, wherein the fuel rod network has a square outer contour.

* * * * *